(12) United States Patent
Kojima et al.

(10) Patent No.: US 9,601,274 B2
(45) Date of Patent: Mar. 21, 2017

(54) CAPACITOR MODULE WITH TEMPERATURE SENSOR

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Kazunari Kojima, Obu (JP); Yoshiki Tomita, Okazaki (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 393 days.

(21) Appl. No.: 14/220,345

(22) Filed: Mar. 20, 2014

(65) Prior Publication Data

US 2014/0285969 A1    Sep. 25, 2014

(30) Foreign Application Priority Data

Mar. 20, 2013 (JP) .................................. 2013-057420
Dec. 26, 2013 (JP) .................................. 2013-268617

(51) Int. Cl.

| H01G 2/14 | (2006.01) |
|---|---|
| H01G 2/10 | (2006.01) |
| H01G 4/38 | (2006.01) |
| H01G 4/224 | (2006.01) |
| G01K 13/00 | (2006.01) |

(52) U.S. Cl.
CPC .............. *H01G 2/14* (2013.01); *H01G 2/106* (2013.01); *H01G 4/224* (2013.01); *H01G 4/38* (2013.01); *G01K 13/00* (2013.01); *Y02T 10/7022* (2013.01)

(58) Field of Classification Search
CPC ........................ H02H 7/16; H01G 2/10–2/106
USPC ......................................................... 374/152
See application file for complete search history.

(56) References Cited

U.S. PATENT DOCUMENTS

| 8,149,567 B2 * | 4/2012 | Niigaki | H01G 2/04 361/274.2 |
|---|---|---|---|
| 8,780,557 B2 * | 7/2014 | Duppong | H05K 7/209 165/80.4 |
| 9,107,286 B2 * | 8/2015 | Tsuchiya | E02F 9/0858 |
| 2011/0007480 A1 * | 1/2011 | Souda | B60K 6/28 361/728 |
| 2013/0279114 A1 * | 10/2013 | Nishikimi | B60K 6/28 361/699 |

FOREIGN PATENT DOCUMENTS

| JP | 2004312925 A * | 11/2004 |
|---|---|---|
| JP | 2009-111370 | 5/2009 |

(Continued)

*Primary Examiner* — Minh Phan
*Assistant Examiner* — Leon W Rhodes, Jr.
(74) *Attorney, Agent, or Firm* — Nixon & Vanderhye P.C.

(57) ABSTRACT

In a capacitor module, a capacitor, a seal member that seals the capacitor, an electronic element electrically connected to the capacitor, a temperature sensor that measures a temperature around the capacitor, and a wire member electrically connected to the temperature sensor are provided. A holder holds at least the electronic element, the temperature sensor, and the wire member. The holder is fixed to the seal member while the temperature sensor is located between the electronic element and at least part of the capacitor via the seal member.

12 Claims, 7 Drawing Sheets

(56) References Cited

FOREIGN PATENT DOCUMENTS

| | | | | |
|---|---|---|---|---|
| JP | 2009106073 | A | * | 5/2009 |
| JP | 2009111370 | A | * | 5/2009 |
| JP | 2009278794 | A | * | 11/2009 |
| JP | 2011-096917 | | | 5/2011 |
| JP | 2012217322 | A | * | 11/2012 |

* cited by examiner

CAPACITOR MODULE WITH TEMPERATURE SENSOR

CROSS REFERENCE TO RELATED APPLICATIONS

This application is based on and claims the benefit of priority from Japanese Patent Applications 2013-057420 and 2013-268617 filed on Mar. 20, 2013 and Dec. 26, 2013, respectively, the disclosure of each of which is incorporated in its entirety herein by reference.

TECHNICAL FIELD

The present disclosure relates to capacitor modules with a temperature sensor.

BACKGROUND

Power converters, such as inverters, are essential components for various machines using DC and/or AC power, such as electric vehicles, hybrid vehicles, and so on. These power converters use resin-molded capacitors in view of their mechanical strength, heat resistance, and moisture resistance. An input of a large current to a resin-molded capacitor results in a large amount of heat generated from the resin-molded capacitor itself. This may reduce the insulation resistance and the lifetime of the resin-molded capacitor. Thus, in order to control an amount of heat generated from a resin-molded capacitor, there is a technology disclosed in, for example, Japanese Patent Application Publication No. 2009-111370.

In the technology, a capacitor and a temperature sensor are resin-molded with each other, so that they are molded, i.e. enclosed, in a hardened resin as a resin mold, i.e. package. In the resin mold, the temperature sensor is arranged to be close to the capacitor. A controller is provided to be connected to the temperature sensor via a wire harness. The controller is operative to detect an amount of heat generated from the capacitor itself as a temperature of the capacitor when a current is input to the capacitor, and control an amount of the input current to the capacitor according to the detected amount of heat.

SUMMARY

In various machines, such as power converters, resin-molded capacitors are used together with other electronic elements, such as discharging resistors, for discharging the resin-molded capacitors. For this reason, resin-molded capacitors are sensitive to heat generated from other electronic elements disposed therearound and connected thereto in addition to heat generated from the capacitors themselves. Thus, it is necessary to consider thermal damage, i.e. heat damage, to resin-molded capacitors; the thermal damage is due to heat generated from other electronic elements disposed around the resin-molded capacitors and connected thereto.

However, the technology disclosed in the Patent Publication fails to consider that resin-molded capacitors receive heat generated from other electronic elements disposed therearound and connected thereto. Thus, it may be difficult for the technology disclosed in the Patent Publication to accurately detect thermal damage to the resin-molded capacitors.

In addition, in the technology disclosed in the Patent Publication, during a process of assembling such a resin-molded capacitor, it may be difficult to arrange a wire harness at a desired position in the resin mold while the resin mold is in non-hardened state, i.e. before hardened. This may result in reduction of the workability of assembling a resin-molded capacitor.

In view of the circumstances set forth above, one aspect of the present disclosure seeks to provide capacitor modules, which are capable of addressing the problems set forth above.

Specifically, an alternative aspect of the present disclosure aims to provide such capacitor modules, each of which is capable of accurately detecting thermal damage to a capacitor while improving the workability of assembling the capacitor module.

According to an exemplary aspect of the present disclosure, there is provided a capacitor module. The capacitor module includes a capacitor, a seal member that seals the capacitor, an electronic element electrically connected to the capacitor, a temperature sensor that measures a temperature around the capacitor, and a wire member electrically connected to the temperature sensor. The capacitor module also includes a holder that holds at least the electronic element, the temperature sensor, and the wire member. The holder is fixed to the seal member while the temperature sensor is located between the electronic element and at least part of the capacitor via the seal member.

In the exemplary aspect of the present disclosure, the temperature sensor is located between the electronic element and at least part of the capacitor via the seal member, and the holder that holds the temperature sensor and the electronic element is fixed to the seal member that seals the capacitor. This configuration permits the temperature sensor to be reliably sensitive to heat generated from the capacitor and heat generated from the electronic element. Thus, it is possible to accurately detect, based on a temperature measured by the temperature sensor, thermal damage from and/or to the capacitor.

In addition, the wire member connected to the temperature sensor is held by the holder, resulting in improvement of an assembling work of the wire member in the capacitor module. This is because merely fixation of the holder holding the wire member to the seal member assembles the wire member at a desired position in the capacitor module.

As described above, the present disclosure makes it possible to provide capacitor modules, each of which is capable of accurately detecting thermal damage from and/or to a capacitor while improving the workability of assembling a corresponding one of the capacitor modules.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

INTRODUCTION OF EMBODIMENT

Figure 1:
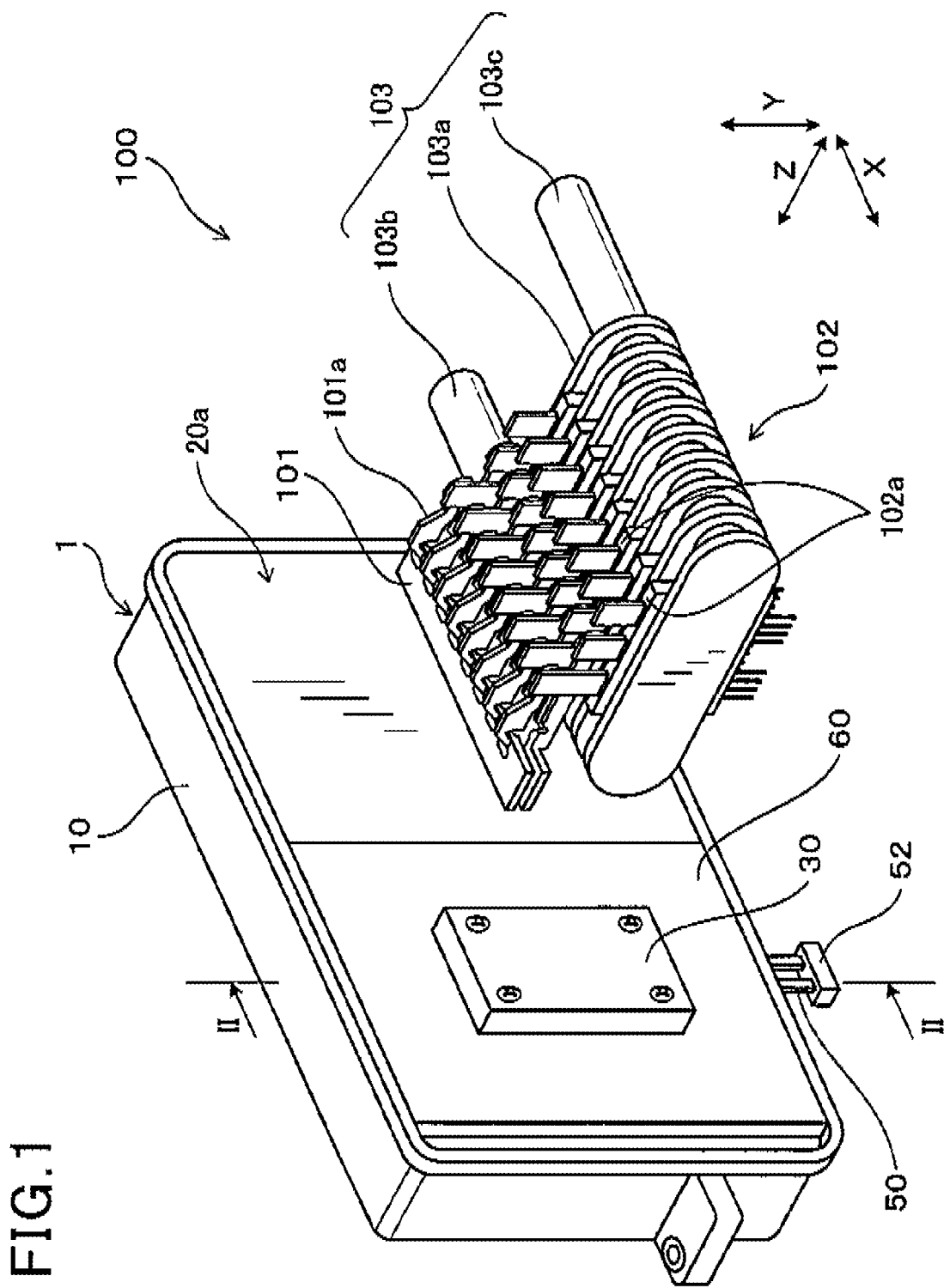
FIG. 1 is a schematic perspective view of a capacitor module according to a first embodiment of the present disclosure.

As a first preferable embodiment of the exemplary aspect of the present disclosure, the holder is made from a resin member, and the wire member is molded in the holder. In the first preferable embodiment, it is possible to easily and reliably fix the wire member to the holder, thus more improving the workability of assembling the capacitor module. For example, the wire member can be formed on a surface of the holder. This example also easily and reliably fixes the wire member to the holder.

As a second preferable embodiment of the exemplary aspect of the present disclosure, the holder has a substantially plate-like shape, a first surface, and a second surface opposite thereto. The electronic element is fixedly mounted over the first surface of the holder, and the second surface of the holder faces the capacitor. In the second preferable embodiment, it is possible to more accurately detect thermal damage from and/or to the capacitor in consideration of heat generated from the electronic element.

As a third preferable embodiment of the exemplary aspect of the present disclosure, the electronic element is comprised of a discharging resistor. In the third preferable embodiment, the temperature sensor is capable of measuring a temperature around the capacitor based on heat generated from the discharging resistor. Thus, it is possible to effectively improve the accuracy of detecting thermal damage from and/or to the capacitor. In place of a discharging resistor for, for example, discharging charge stored in the capacitor, a current sensor, a busbar, or other similar electronic elements can be used as the electronic element.

DETAILED DESCRIPTION OF EMBODIMENT

Specific embodiments of the present disclosure will be described hereinafter with reference to the accompanying drawings.

First Embodiment

Referring to FIGS. 1 to 4, a capacitor module 1 according to a first embodiment of the present disclosure is comprised of a case 10, a plurality of capacitors 11, a seal member 20, an electronic element 30, a temperature sensor 40, wires as an example of a wire member, 50 for the temperature sensor 40, and a holder 60.

In the case 10, the capacitors 11 are installed while the seal member 20 is filled therein to enclose the capacitors 11. The electronic element 30 is electrically connected to the capacitors 11 via connection lines C. Note that how the electronic element 30 is electrically connected to the capacitors 11 can be selected from various connection methods and configurations. So, in FIG. 2, dashed connection lines C between the capacitors 11 and the electronic element 30 are schematically illustrated.

The temperature sensor 40 is operative to measure a temperature of each of the capacitors 11. The wires 50 are electrically connected to the temperature sensor 40.

The holder 60 is configured to hold the electronic element 30, the temperature sensor 40, and the wires 50, and is fixed to the seal member 20 such that the temperature sensor 40 is located between the capacitors 11 and the electronic element 30. In the present disclosure, a sentence that an element A holds an element B means that an element A directly holds the element B or indirectly holds the element B via another element. Similarly, in the present disclosure, a sentence that an element A is connected or fixed to an element B means that the element A is directly connected or fixed to the element B or indirectly connected or fixed thereto via another element. In addition, a sentence that an element A is mounted over an element B means that the element A is directly mounted on the element B or indirectly mounted over the element B via another element.

The capacitor module 1 is also comprised of a busbar module 101 enclosed in the seal member 20, a part 101a of which is exposed outwardly from the seal member 20. The busbar module 101 is electrically connected to a stacked switching unit 102. The stacked switching unit 102 includes, for example, a plurality of power cards 102a and a plurality of inner-hollow plate-like cooling channels 103a are alternately laminated on each other.

In each of the power cards 102a, a corresponding high- or low-side semiconductor switching element, a corresponding flywheel diode, a temperature-sensitive diode, and so on, are encapsulated. Thus, a power card 102a constitutes a semiconductor module.

Each of the cooling channels 103a has a first end and a second end. The first ends of the cooling channels 103a are communicably joined to a coolant inlet pipe 103b, and the second ends of the cooling channels 103a are also communicably joined to a coolant outlet pipe 103c. A coolant is supplied to be circulated through the coolant inlet pipe 103b, the cooling channels 103a, and the coolant outlet pipe 103c, thus cooling the power cards 102a. Thus, the cooling channels 103a, the coolant inlet pipe 103b, and the coolant outlet pipe 103c serve as a cooling mechanism 103.

That is, the stacked switching unit 102 and the capacitor module 1 constitute a part of a power converter 100.

The case 10 has, for example, a substantially rectangular-parallelepiped box shape with an opening sidewall. The opening side wall will be referred to as an opening top wall of the case 10 in a height direction of the case 10 corresponding to a direction illustrated as the arrow Z in FIG. 1. The case 10 can be made from, for example, a resin, such as a PPS (polyphenylene sulfide) resin, a PBT (polybutylene terephthalate) resin, a PC (polycarbonate) resin, an EP (epoxy) resin, a Nylon® resin, or the like. In the first embodiment, a PPS resin is used.

In the first embodiment, as the plurality of capacitors 11, same type of two capacitors 11 having a size and a shape are for example used.

In the case 10, the two capacitors 11 are so mounted on an inner surface of a bottom wall, which is opposite to the opening top wall, of the case 10 as to be accommodated. Referring to FIG. 2, the capacitors 11 are aligned with a lateral direction of the case 10 (see the Y direction in FIG. 1), which is orthogonal to a longitudinal direction of the case 10 thereof (see the X direction in FIG. 1). For example, one end E of one of the capacitors 11 is close to one end of the other of the capacitors 11 in the Y direction. In the case 10, the capacitors 11 are electrically connected to the stacked switching unit 102 via the busbar module 101.

The outer periphery of the case 10, which forms the opening top wall, projects outwardly in an X-Y plane based on the X and Y directions and extends in the Z direction to serve as a rectangular flange 10a for supporting the holder 60.

In the case 10, the seal member 20 is filled as a resin filler to enclose the capacitors 11, thus fixing the capacitors 11 to the case 10. For example, during a process of assembling the capacitor module 1, an unhardened resin filler is filled in the case 10 while the capacitors 11 are mounted on the inner surface of the bottom wall of the case 10. Thereafter, the uncured resin filler filled in the case 10 is hardened as the seal member 20, so that the capacitors 11 are potted to be sealed in the seal member 20. As a resin filler used as the seal member 20, an epoxy resin, an urethane resin, a silicone resin, or the like can be used.

Figure 2:
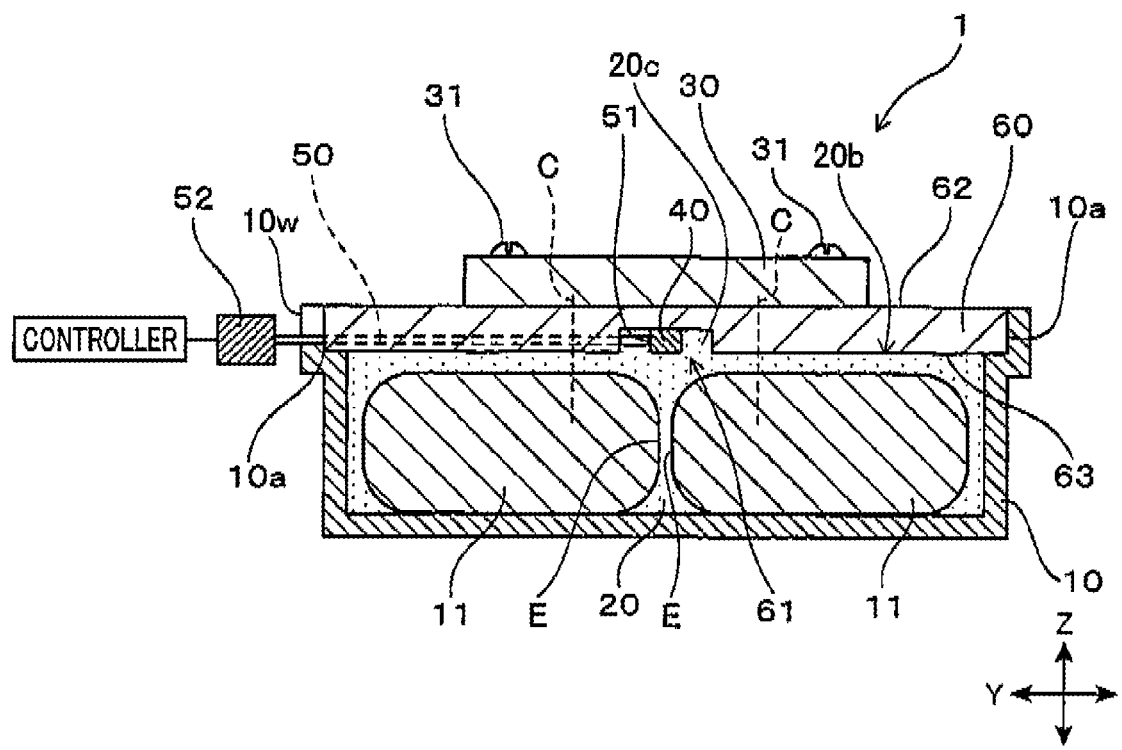
FIG. 2 is a schematic cross sectional view taken on line II-II in FIG. 1.

Referring to FIGS. 1 and 2, the seal member 20 has a first half rectangular-parallelepiped part, referred to as a first part, 20a and a second half rectangular-parallelepiped part, referred to as a second part, 20b arranged in the longitudinal direction (X direction) of the case 10. As illustrated in FIG. 1, the busbar module 101 has terminals 101a for the stacked switching unit 102. The busbar module 101 also has a positive busbar and a negative busbar, the positive busbar is electrically connected to positive electrodes of the capacitors 11, and the negative busbar is electrically connected to negative electrodes of the capacitors 11. The positive and negative busbars are electrically connected to the terminals 101a, and the terminals 101a are penetrated from the first rectangular-parallelepiped part 20a of the seal member 20 in the Z direction to be electrically connected to the corresponding power cards 102a of the stacked switching unit 102. This connection configuration establishes electrical connection between the capacitors 11 and the semiconductor modules (power cards) 102a.

For example, in the first embodiment, the capacitors 11 are connected in a predetermined configuration to serve as a smoothing capacitor that smoothes DC power obtained based on the switching operations of the switching unit 102. The capacitors 11 are electrically connected to another element in the power converter 100, for example, a reactor or the like, through a given connection member. For example, a second busbar module disclosed in the fourth embodiment described later can be used as the connection member.

The second part 20b of the seal member 20 is fitted in a corresponding region of the opening top wall of the case 10. A substantially rectangular center of a top surface of the second part 20b protrudes in the Z direction of the case 10 to be away from the case 10; the protruded portion of the second part 20b serves as a securing member 20c for securing the temperature sensor 40 and the wires 50.

The holder 60 is made from, for example, a resin, such as a PPS resin, a PBT resin, a PC resin, an EP resin, a Nylon® resin, or the like. In the first embodiment, a PPS resin, which is the same material as that of the case 10, is used.

The holder 60 has a substantially plate-like shape. The holder 60 is fitted in a corresponding region of the flange 10a of the case 10; the region matches the top surface of the second part 20b of the seal member 20. This results in the holder 60 being mounted at its bottom surface 63 on the top surface of the second part 20b of the seal member 20. The bottom surface 63 of the holder 60 faces the capacitors 11 via the seal member 20.

The holder 60 has a substantially rectangular-parallelepiped concave recess 61 formed in the bottom surface 63 at a substantially center thereof such that the securing member 20c is fitted in the concave recess 61. The temperature sensor 40 is enclosed to be secured in the securing member 20c, so that the temperature sensor 40 is held by the holder 60 via the securing member 20c. Specifically, the temperature sensor 40 is located between the electronic element 30 and the end E of each of the capacitors 11.

Figure 3:
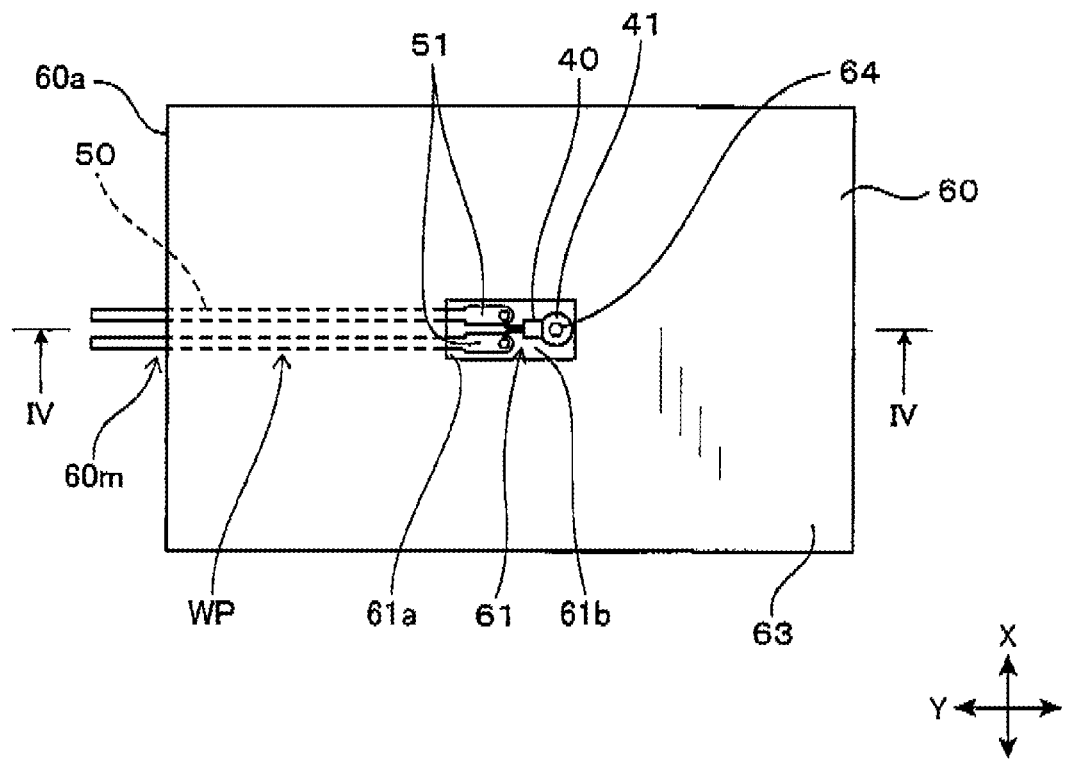
FIG. 3 is a schematic plan view of a bottom surface of a holder itself illustrated in FIG. 1.
Figure 4:
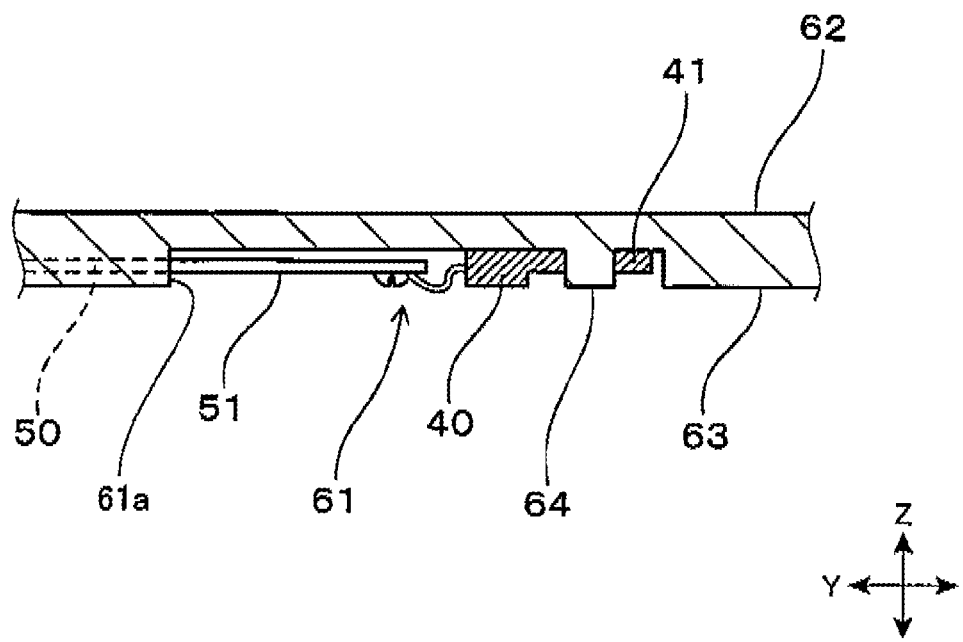
FIG. 4 is a schematic cross sectional view taken on line IV-IV in FIG. 3.

Referring to FIGS. 2 to 4, a substantially middle portion 60m of one side surface 60a of the holder 60 faces a corresponding sidewall 10w of the flange 10a. The concave recess 61 has one inner surface 61a that faces the side surface 60a of the holder 60. Between the middle portion 60m of the side surface 60a of the holder 60 and the inner surface 61a of the concave recess 61, there is a portion serving as a wire-holding portion WP in which the wires 50 are enclosed to extend in the Y direction. Specifically, in the wire-holding portion WP of the holder 60, the wires 50 are held such that one end of each wire 50 is penetrated from the wire-holding portion WP of the holder 60 into the securing member 20c, i.e. the concave recess 61. The penetrating ends of the wires 50 serve as a connection terminal 51 to be electrically connected to the temperature sensor 40 in the securing member 20c. The other end of each wire 50 is penetrated from the side surface 60a to be connected to a connector 52.

For example, the wires 50 are integrally molded together with the holder 60 while the wires 50 are inserted in the holder 60 by, for example, insert molding. The connector 52 is electrically connected to a controller C. For example, each of the wires 50 is formed by punching out a copper plate by press working.

The temperature sensor 40 is operative to measure a temperature therearound, and send a measurement signal indicative of the measured temperature to the controller via the wires 50. The controller is electrically connected to, for example, a current supply element (not shown) for supplying an input current to the capacitors 11. The controller is operative to receive the measurement signal, and control an amount of the input current to be supplied from the current supply element to the capacitors 11 as a function of a level of the measurement signal. This permits the controller to detect thermal damage to and/or from the capacitors 11, and to control the amount of the input current to the capacitors 11 as the detected thermal damage to and/or from the capacitors 11.

The holder 60 also has a top surface 62 opposite to the bottom surface 63. On the top surface 62, the electronic element 30 is fixedly mounted. Specifically, the electronic element 30 can be located directly on the top surface 62 or indirectly located over the top surface 62 via one or more elements. In other words, saying that the electronic element 30 is mounted over the top surface 32 means that the electronic element 30 is directly mounted on the top surface 32 or indirectly mounted over the top surface via another element. In the first embodiment, the electronic element 30 has a rectangular-parallelepiped packaged structure, and is, for example, comprised of a discharging resistor electrically connected to the capacitors 11 for discharging the capacitors 11. The electronic element 30 is provided with four threads 31 through its respective corners. The four threads 31 are threadably fitted in corresponding four threaded holes (not shown) formed through predetermined positions of the top surface 62 of the holder 60, so that the electronic element 30 is fixed at a substantially center of the top surface 62 of the holder 60. This results in a bottom surface of the package of the electronic element 30 being in contact with the top surface 62 of the holder 60. The electronic element 30 can be fixed to the center of the top surface 62 of the holder 60 by another fixation method, such as adherence.

As illustrated in FIGS. 3 and 4, the holder 60 is provided with a positioning protrusion 64 formed on an inner bottom surface 61b of the concave recess 61 toward the bottom wall of the case 10. The positioning protrusion 64 has, for example, a substantially cylindrical shape.

The temperature sensor 40 has, for example, a positioning annular portion 64 shaped to fit in the positioning protrusion 64. While the positioning annular portion 64 is fitted in the positioning protrusion 64, the temperature sensor 40 is positioned in the concave recess 61. As described above, while the temperature sensor 41 is positioned in the concave recess 61, the temperature sensor 41 is electrically connected to the connection terminal 51, which is exposed in the concave recess 61 by soldering or another known bonding method.

That is, as described above, while the temperature sensor 40 is positioned in the concave recess 61, the temperature sensor 40 and the positioning annular portion 64 are enclosed to be secured in the securing member 20c of the seal member 20.

Specifically, during a process of assembling the capacitor module 1, an unhardened resin filler is filled in the case 10 with the flange 10a in which the holder 60 is fitted, so that the bottom surface 63 of the holder 60 and the temperature sensor 40 positioned in the concave recess 61 by the positioning annular portion 64 are in contact with the unhardened resin filler. Thereafter, the unhardened resin filler filled in the case 10 is hardened as the seal member 20, so that the holder 60 is fixed to the case 10, and the temperature sensor 40 and the positioning annular portion 64 are molded, i.e. enclosed, in the securing member 20c of the seal member 20. This results in the temperature sensor 40 and the positioning annular portion 64 being secured to the holder 60, and in the temperature sensor 40 being located close to the capacitors 11 via, the seal member 20.

Next, how the capacitor module 1 works and achieves technical effects will be described hereinafter.

As described above, the capacitor module 1 is configured such that the temperature sensor 40 is located close to the capacitors 11 via the seal member 20. This configuration permits the temperature sensor 40 to measure a temperature of a portion of the seal member 20 close to the capacitors 11. This achieves a technical effect of accurately measuring thermal damage caused by heat generated from the capacitors 11.

The capacitor module 1 is also configured such that the temperature sensor 40 is located between the capacitors 11 and the electronic element 30. Because the electronic element 30 faces the capacitors 11, a portion of the capacitor module 1 located between the electronic element 30 and the capacitors 11 in the Z direction is likely to be high in temperature due to heat generated from the capacitors 11 themselves and heat generated from the electronic element 30. In this point, the temperature sensor 40 according to the first embodiment is located between the capacitors 11 and the electronic element 30. For this reason, the temperature sensor 40 more accurately measures a temperature of each of the capacitors 11 as a parameter indicative of thermal damage from and/or to each of the capacitors 11 even if the capacitors 11 receive the heat transferred from the electronic element 30. This makes it possible to more accurately measure thermal damage from and/or to the capacitors 11.

The capacitor module 1 is further configured such that the wires 50 for the temperature sensor 40 are integrally molded in the holder 60. This configuration makes it possible to easily locate the terminal 51 of the wires 50 at a desired position in the holder 60 while fixing the wires 50 to the holder 60.

Particularly, the holder 60 has the concave recess 61 formed in the bottom surface 63, which faces the capacitors 11, at a substantially center thereof, and, in the concave recess 61, the temperature sensor 40 is located. This configuration makes it possible to easily locate the terminal 51 of the wires 50 in the concave recess 61 so as to be exposed therein. This configuration therefore easily establishes electric connection between the temperature sensor 40 and the exposed terminal 51 of the wires 50.

Thus, this configuration of the capacitor module 1 improves the workability of assembling the capacitor module 1.

In addition, the temperature sensor 40 is enclosed to be secured in the securing member 20c while being connected to the terminal 51 of the wires 50, so that the temperature sensor 40 is securely held by the holder 60 via the securing member 20c. This configuration reliably maintains the fixation of the temperature sensor 40 to the holder 60, and the electrical and physical connection between the temperature sensor 40 and the terminal 51 of the wires 50.

Moreover, the capacitor module 1 is configured such that, at the opening top wall of the case 10, the busbar module 101 is located on the first part 20a of the seal member 20 and the holder 60 is located on the second part 20b of the seal member 20. The busbar module 101 is connected to the stacked switching unit 102 in which a coolant is circulated through the cooling channels 103a and the inlet and outlet coolant pipes 103b and 103c to cool the power cards 102a.

Specifically, in the capacitor module 1, there is heat dissipation around the busbar module 101 due to the cooling performance of the cooling mechanism 103 comprised of the cooling channels 103a and the inlet and outlet coolant pipes 103b and 103c. This causes the holder side of the capacitor module 1 to be relatively higher in temperature than the busbar-module side thereof. In view of the characteristics, the capacitor module 1 according to the first embodiment is configured such that the temperature sensor 40 is mounted on the holder 60 and operative to measure a temperature therearound, i.e. a temperature around the holder side of the capacitor module 1 higher than that around the busbar-module side thereof. This configuration therefore makes it possible to further accurately measure thermal damage from and/or to the capacitors 11.

Second Embodiment

A capacitor module 1A according a second embodiment of the present disclosure will be described hereinafter with reference to FIG. 5.

The structure and/or functions of the capacitor module 1A according to the second embodiment are different from those of the capacitor module 1 by the following points. So, the different points will be mainly described hereinafter, and therefore, redundant descriptions of like parts between the embodiments, to which like reference characters are assigned, are omitted or simplified.

Figure 5:
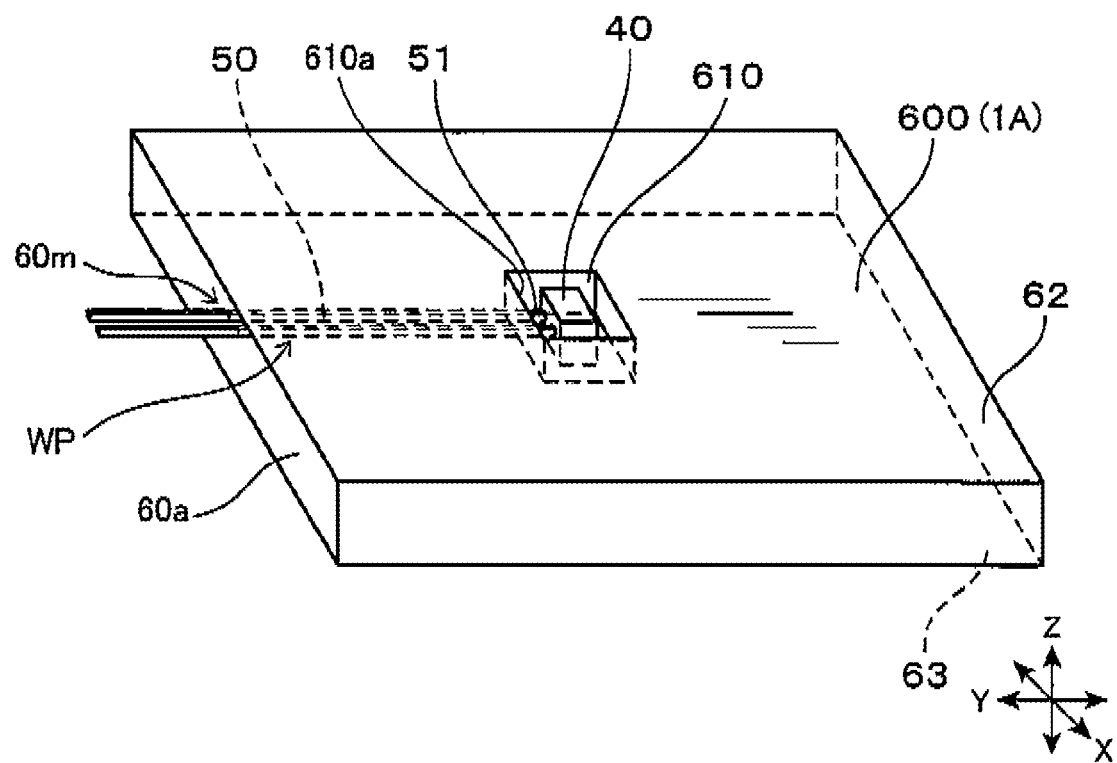
FIG. 5 is a schematic perspective view of a holder itself according to a second embodiment of the present disclosure.

Referring to FIG. 5, the capacitor module 1A is comprised of a holder 600 in place of the holder 60.

Referring to FIG. 5, the holder 600 has a substantially plate-like shape. The holder 600 is so fitted in the flange 10a of the case 10 as to be mounted at its bottom surface 63 on the top surface of the second part 20b of the seal member 20. The bottom surface 63 of the holder 600 faces the capacitors 11 via the seal member 20. On a top surface 62 of the holder 600 opposite to the bottom surface 63, the electronic element 30 is mounted.

The holder 600 has a through hole 610 penetrated from a substantially center of the top surface 62 to a corresponding center of the bottom surface 63. The through hole 610 has a substantially rectangular-parallelepiped shape in its cross section orthogonal to the Z direction. The securing member 20c is fitted in the through hole 610. The temperature sensor 40 is enclosed to be secured in the securing member 20c, so that the temperature sensor 40 is held by the holder 600 via the securing member 20c.

Referring to FIG. 5, the through hole 610 has an inner surface 610a that faces the side surface 60a of the holder 600. Between the middle portion 60m of the side surface 60a of the holder 600 and the inner surface 610a of the through hole 610, there is a portion serving as a wire-holding portion WP in which the wires 50 are enclosed to extend in the Y direction. The penetrating ends of the wires 50 serve as the connection terminal 51 to be electrically connected to the temperature sensor 40 in the securing member 20c, i.e. the through hole 610.

That is, the temperature sensor 40 is enclosed to be secured in the securing member 20c of the seal member 20 filled in the through hole 610.

Specifically, during a process of assembling the capacitor module 1, an unhardened resin filler is filled in the case 10 while the holder 600 is fitted in the flange 10a of the case 10, so that the bottom surface 63 of the holder 600 and the temperature sensor 40 positioned in the through hole 610 are in contact with the unhardened resin filler. Thereafter, the unhardened resin filler filled in the case 10 is hardened as the seal member, so that the holder 600 is fixed to the case 10, and the temperature sensor 40 is molded, i.e. enclosed, in the securing member 20c of the seal member 20 filled in the through hole 610. This results in the temperature sensor 40 being secured to the holder 600 and located close to the capacitors 11 via the seal member 20.

As described above, the capacitor module 1A is configured such that the temperature sensor 40 is located close to the capacitors 11 via the seal member 20, and located between the capacitors 11 and the electronic element 30. In addition, the wires 50 for the temperature sensor 40 are integrally molded in the holder 600, and the holder 600 has the through hole 610 formed therethrough, and, in the through hole 610, the temperature sensor 40 is located to be enclosed in the securing member 20c of the seal member 20 filled in the through hole 610.

Thus, because the capacitor module 1A has a substantially identical configuration to that of the capacitor module 1 except for the difference between the through hole 610 and the concave recess 61, it achieves the same technical effects as those achieved by the capacitor module 1 according to the first embodiment.

Additionally, the configuration of the capacitor module 1A permits the temperature sensor 40 to be installed in the through hole 600 from either the side of the top surface 62 or the side of the bottom surface 63. This achieves an additional technical effect of further improving the workability of assembling the capacitor module 1A.

Third Embodiment

A capacitor module 1B according a third embodiment of the present disclosure will be described hereinafter with reference to FIG. 6.

The structure and/or functions of the capacitor module 1B according to the third embodiment are different from those of the capacitor module 1 by the following points. So, the different points will be mainly described hereinafter, and therefore, redundant descriptions of like parts between the embodiments, to which like reference characters are assigned, are omitted or simplified.

Figure 6:
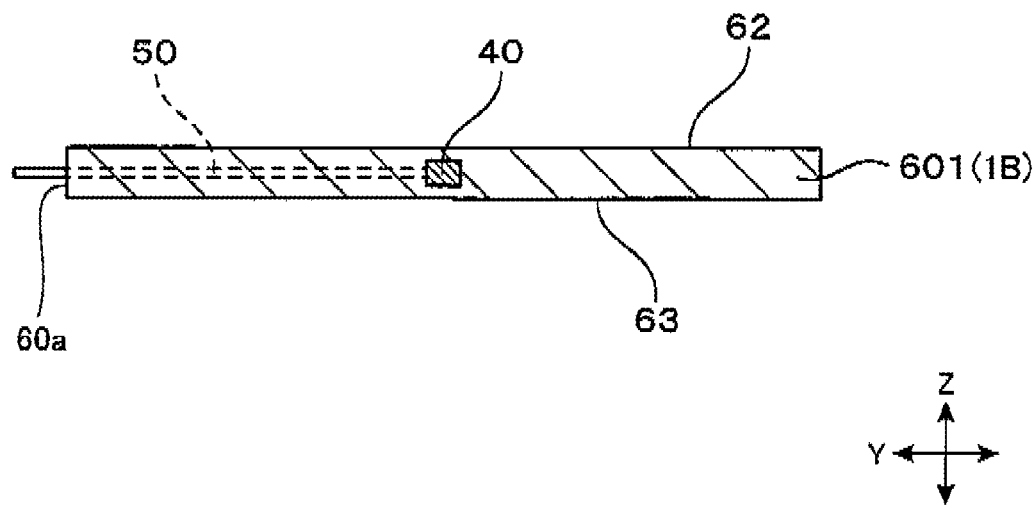
FIG. 6 is a schematic cross sectional view of a holder itself, which corresponds to FIG. 4, according to a third embodiment of the present disclosure.

Referring to FIG. 6, the capacitor module 1B is comprised of a holder 601 in place of the holder 60.

Referring to FIG. 6, the holder 601 has a substantially plate-like shape. The holder 601 is so fitted in the flange 10a of the case 10 as to be mounted at its bottom surface 63 on the top surface of the second part 20b of the seal member 20. The bottom surface 63 of the holder 600 faces the capacitors 11 via the seal member 20. On a top surface 62 of the holder 601 opposite to the bottom surface 63, the electronic element 30 is mounted.

The holder 601 has no through holes and concave recesses for holding the temperature sensor 40. Specifically, in the holder 601, the temperature sensor 40 is molded, i.e. enclosed, together with the wires 50 while one end of each wire 50 is electrically connected as the connection terminal 51 to the temperature sensor 40. The other end of each wire 50 is penetrated from the side surface 60a to be connected to the connector 52 (see FIG. 2).

That is, the temperature sensor 40 and the wires 50 are integrally installed in the holder 601 while they are electrically connected to each other.

As described above, the capacitor module 1B is configured such that the temperature sensor 40 is located close to the capacitors 11 via the holder 601 and the seal member 20, and located between the capacitors 11 and the electronic element 30. In addition, the temperature sensor 40 and the wires 50 electrically connected thereto are enclosed in the holder 601.

Thus, because the capacitor module 13 has a substantially identical configuration to that of the capacitor module 1 except for the difference between the structure of the holder 601 and that of the holder 60, it achieves the same technical effects as those achieved by the capacitor module 1 according to the first embodiment.

Additionally, during a process of assembling the capacitor module 1B, the holder 601 in which the temperature sensor 40 and the wires 50 electrically connected thereto are installed is prepared, and the holder 601 is fitted in the flange 10a of the case 1, so that the temperature sensor 40 is completely installed in the case 1.

Thereafter, an unhardened resin filler is filled in the case 10 while the holder 601 is fitted in the flange 10a of the case 10, so that the bottom surface 63 of the holder 601 in which the temperature sensor 40 is installed is in contact with the unhardened resin filler. Thereafter, the unhardened resin filler filled in the case 10 is hardened as the seal member 20, so that the holder 601 is secured to the case 10.

Specifically, this configuration of the capacitor module 13 makes easy the installation work and the positioning work of the temperature sensor 40 in the case 1 and the electrical connection work between the temperature sensor 40 and the wires 50. This achieves an additional technical effect of still further improving the workability of assembling the capacitor module 1B.

Fourth Embodiment

A capacitor module 1C according a fourth embodiment of the present disclosure will be described hereinafter with reference to FIG. 7.

The structure and/or functions of the capacitor module 1C according to the fourth embodiment are different from those of the capacitor module 1 by the following points. So, the different points will be mainly described hereinafter, and therefore, redundant descriptions of like parts between the embodiments, to which like reference characters are assigned, are omitted or simplified.

Figure 7:
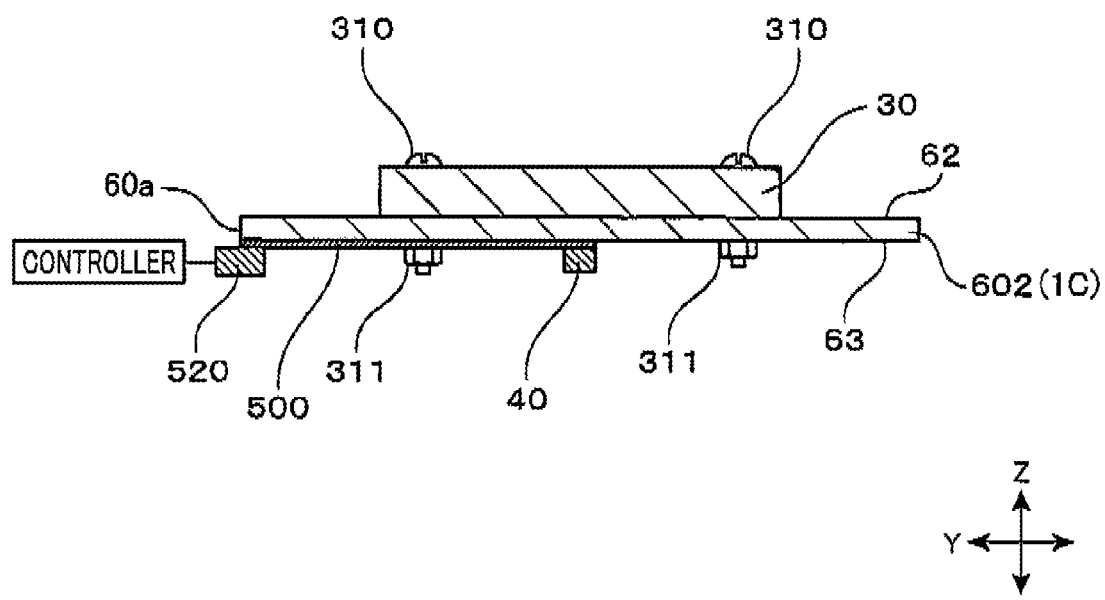
FIG. 7 is a schematic cross sectional view of a holder on which an electronic element is mounted according to a fourth embodiment of the present invention.

Referring to FIG. 7, the capacitor module 1C is comprised of a holder 602 in place of the holder 60.

Referring to FIG. 7, the holder 602 is designed as a printed board having a substantially rectangular-parallelepiped shape.

The holder 602 has a bottom surface 63 facing the capacitors 11. The temperature sensor 40 is fixedly mounted on a substantially center of the bottom surface 63 of the holder 602. On a region of the bottom surface 63 between the side surface 60a and a line passing the center of the bottom surface 63 in parallel to the side surface 60a, a conductor pattern 500 including wire traces for connection of the temperature sensor 40 is printed. A first end of the conductor pattern 500, located close to the center of the bottom surface 63, is electrically connected to the temperature sensor 40 so as to be fixed thereto by, for example, soldering. A second end of the conductor pattern 500 opposite to the first end is electrically connected to a connector 520. The connector 520 is electrically connected to the controller.

In addition, the holder 602 has a top surface 62 on which the electronic element 30 is threadably mounted by through holes, threads 310, and nuts 311.

That is, the temperature sensor 40 and the conductor pattern 500 are fixedly mounted on the bottom surface 63 of the holder 602 while they are electrically connected to each other.

As described above, the capacitor module 1C is configured such that the temperature sensor 40 is located close to the capacitors 11 via the seal member 20, and located between the capacitors 11 and the electronic element 30. In addition, the temperature sensor 40 and the conductor pattern 500 electrically connected thereto are fixedly mounted on the holder 602.

Thus, because the capacitor module 1C has a substantially identical configuration to that of the capacitor module 1 except for the difference between the structure of the holder 602 and that of the holder 60, it achieves the same technical effects as those achieved by the capacitor module 1 according to the first embodiment.

Additionally, during a process of assembling the capacitor module 1C, the holder 602, on which the temperature sensor 40 and the conductor pattern 500 electrically connected thereto are fixedly mounted, is prepared, and the holder 602 is fitted in the flange 10a of the case 1, so that the temperature sensor 40 is completely installed in the case 1.

Thereafter, an unhardened resin filler is filled in the case 10 while the holder 602 is fitted in the flange 10a of the case 10, so that the bottom surface 63 of the holder 602, in which the temperature sensor 40 is installed, is in contact with the resin filler. Thereafter, the unhardened resin filler filled in the case 10 is hardened as the seal member 20, so that the holder 602 is secured to the case 10.

Specifically, this configuration of the capacitor module 1C makes easy the installation work and positioning work of the temperature sensor 40 in the case 1, and the electrical connection work between the temperature sensor 40 and the conductor pattern 500. This achieves an additional technical effect of still further improving the workability of assembling the capacitor module 1C.

Fifth Embodiment

A capacitor module 1D according a fifth embodiment of the present disclosure will be described hereinafter with reference to FIGS. 8 to 10.

The structure and/or functions of the capacitor module 1D according to the fifth embodiment are different from those of the capacitor module 1 by the following points. So, the different points will be mainly described hereinafter, and therefore, redundant descriptions of like parts between the embodiments, to which like reference characters are assigned, are omitted or simplified.

Figure 8:
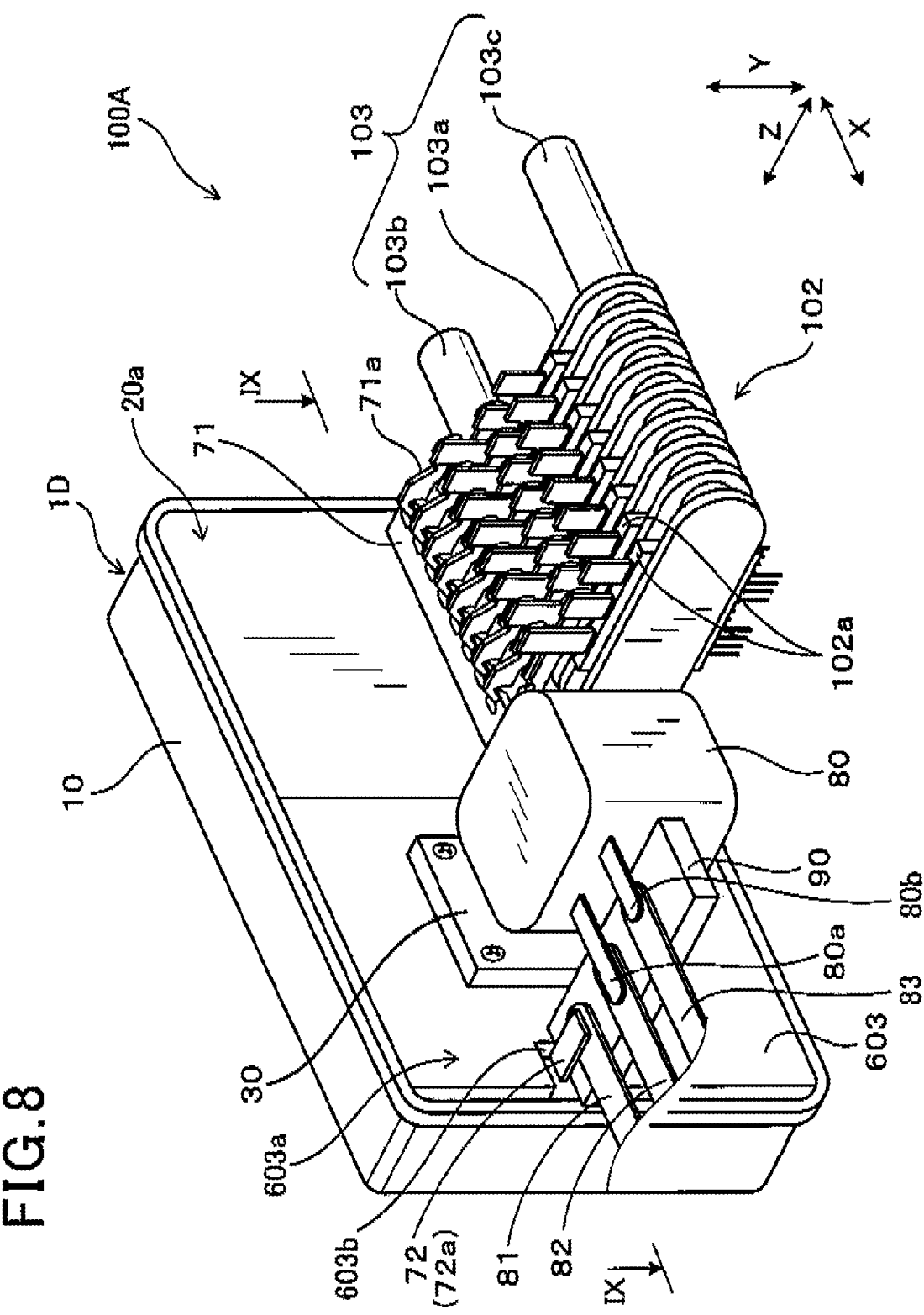
FIG. 8 is a schematic perspective view of a capacitor module according to a fifth embodiment of the present disclosure.
Figure 9:
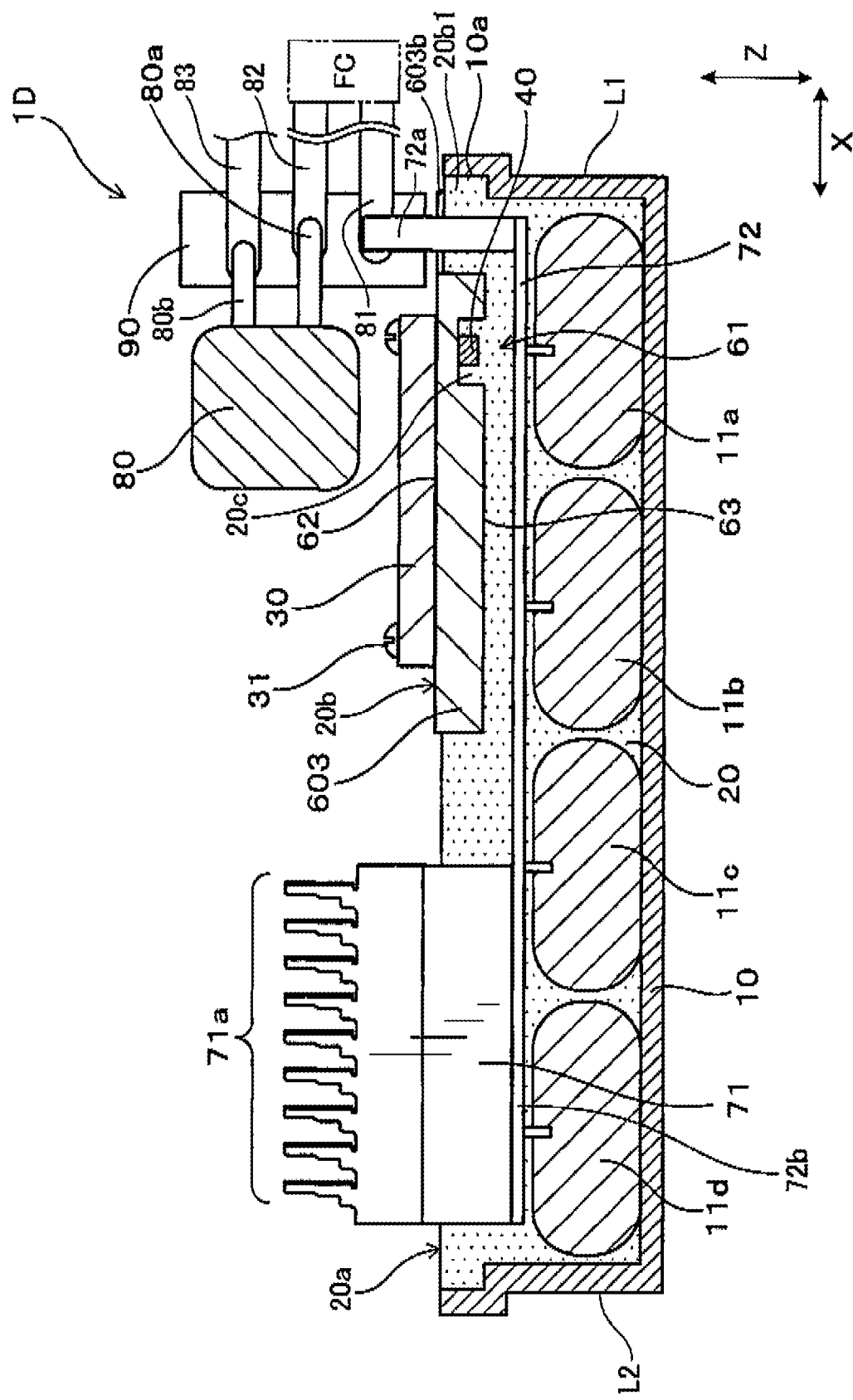
FIG. 9 is a schematic cross sectional view taken on line IX-IX in FIG. 8.
Figure 10:
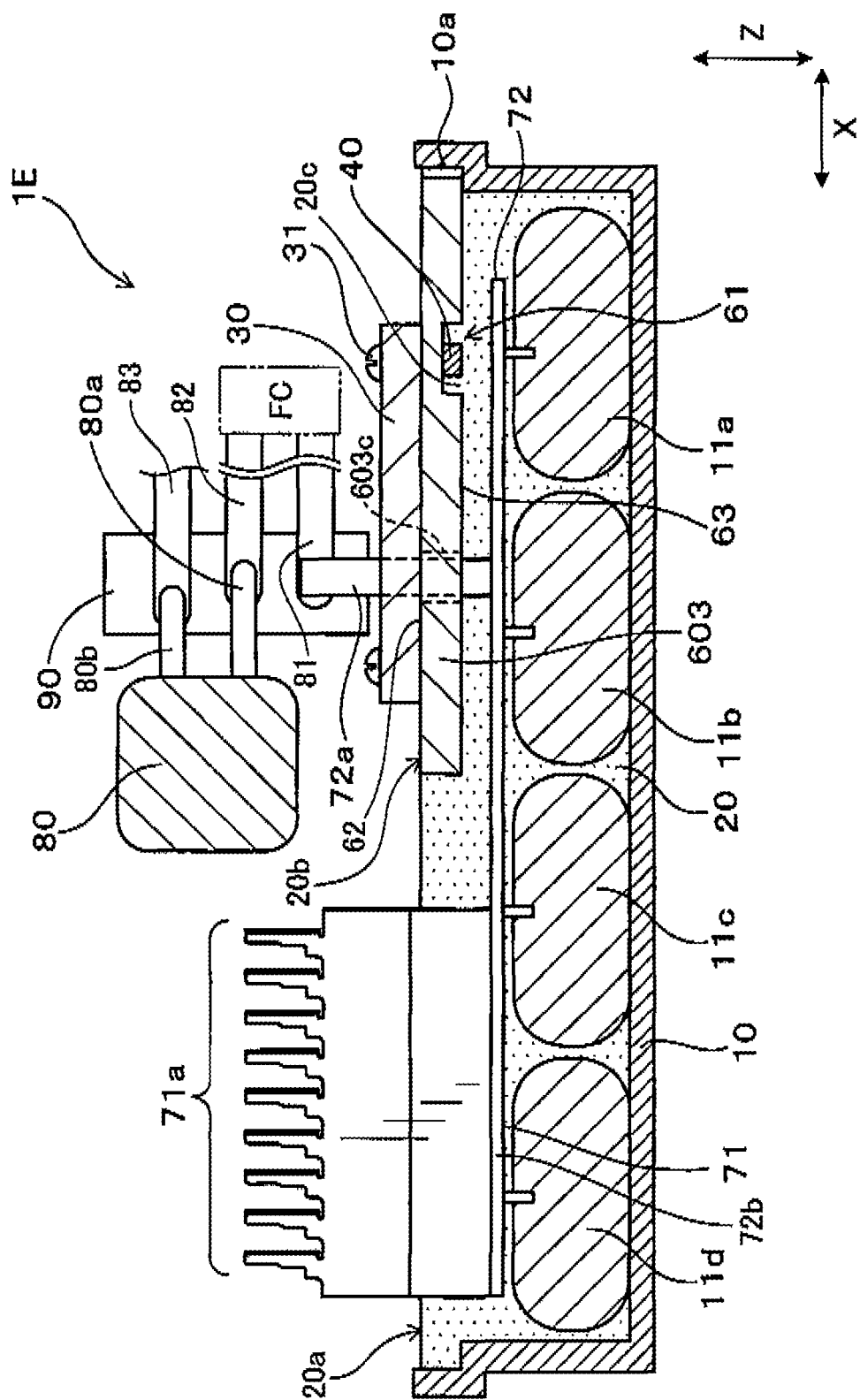
FIG. 10 is a schematic cross sectional view of a capacitor module, which corresponds to FIG. 9, according to a modification of the fifth embodiment.

Referring to FIGS. 8 to 10, the capacitor module 10 constitutes a part of a power converter 100A together with the stacked switching unit 102 including the power cards 102a and the cooling mechanism 103 like the first embodiment.

In the fifth embodiment, as the plurality of capacitors 11, the same type of four capacitors 11 having a size and a shape are for example used.

In the case 10 of the capacitor module 10, the four capacitors 11a, 11b, 11c, and 11d are installed while the seal member 20 is filled therein to enclose the capacitors 11. Specifically, the capacitors 11a to 11d are so mounted on the inner surface of the bottom wall of the case 10 as to be accommodated. Referring to FIG. 9, the capacitors 11a to 11d are arranged in the longitudinal direction (X direction) of the case 10 in this order from a first longitudinal end L1 to a second longitudinal end L2 of the case 10 are illustrated in FIG. 9.

In the fifth embodiment, in place of the holder 60, the capacitor module 1D is provided with a holder 603 for holding the electronic element 30, the detailed description of which will be provided later.

In the fifth embodiment, in place of the busbar module 101, the capacitor module 1D is comprised of a first busbar module 71 and a second busbar module 72. The first busbar module 71 is provided in the first part 20a of the seal member 20.

As illustrated in FIG. 8, the first busbar module 71 has terminals 71a for the stacked switching unit 102. The first busbar module 71 also has a positive busbar and a negative busbar, the positive busbar is electrically connected to positive electrodes of the capacitors 11a to 11d, and the negative busbar is electrically connected to negative electrodes of the capacitors 11a to 11d. The positive and negative busbars are electrically connected to the terminals 71a, and the terminals 71a are penetrated from the first rectangular-parallelepiped part 20a of the seal member 20 in the Z direction to be electrically connected to the corresponding power cards 102a of the stacked switching unit 102. This connection configuration establishes electrical connection between the capacitors 11a to 11d and the semiconductor modules (power cards) 102a. In other words, the first busbar 71 has a positional relationship with respect to each of the capacitors 11a to 11d.

For example, like the first embodiment, in the fifth embodiment, the capacitors 11a to 11d are connected in a predetermined configuration to serve as a smoothing capacitor that smoothes DC power obtained based on the switching operations of the switching unit 102.

The second busbar module 72 is capable of establishing electrical connection between the capacitors 11a to 11d and a reactor 80 and a filter capacitor FC as an example of heat-generating elements of the power converter 100A. For example, the heat-generating elements are elements that generate heat when energized.

Specifically, the second busbar module 72 has a terminal 72a for heat-generating elements of the power converter 100A; the heat-generating elements of the power converter 100A includes a reactor 80 and a filter capacitor FC. The second busbar module 72 also has a negative busbar 72b electrically connected to the negative terminals of the capacitors 11a to 11d. The negative busbar 72b is electrically connected to the terminal 72a, and the terminal 72a is penetrated from one end 20b1 of the second part 20b of the seal member 20 in the Z direction via a corresponding one side 603a of the holder 603 to be electrically connected to a negative-side (N-side) connection terminal 81 of the filter capacitor FC; this end 20b1 is close to the first longitudinal end L1 of the case 10. In other words, the second busbar 72 has a positional relationship with respect to each of the capacitors 11a to 11d.

The power converter 100A is provided with a terminal holder module, a part 90 of which is illustrated in FIG. 8. For example, the part 90 of the terminal holder module will be referred to as a terminal holder 90. The terminal holder module is fixedly supported by, for example, a housing of the power converter 100A or that of the film capacitor, so that the terminal holder 90 is also fixedly supported by the housing of the power converter 100A or that of the film capacitor. The terminal holder 90 is located over the side 603a of the holder 603 corresponding to the end 20b1 of the second part 20b of the seal member 20 in the Z direction.

An end of the N-side connection terminal 81 of the filter capacitor FC extending from the filter capacitor FC in the X direction is fixedly mounted to be supported on the terminal holder 90. The terminal 72a, which is penetrated from the end 20b1 of the second part 20b of the seal member 20 via the side 603a of the holder 603, is mounted on the end of the N-side connection terminal 81 to be electrically connected thereto over the terminal holder 90.

An end of a positive-side (P-side) connection terminal 82 of the filter capacitor FC extending from the filter capacitor FC in the X direction is also fixedly mounted to be supported on the terminal holder 90. One end terminal 80a of the reactor 80 is mounted on the end of the P-side connection terminal 82 to be electrically connected thereto over the terminal holder 90.

A terminal 83, which extends from, for example, a step-up converter of the power converter 100A installed in, for example, the switching unit 102, is fixedly mounted to be supported on the terminal holder 90. On the terminal 83, the other end terminal 80b of the reactor 80 is mounted to be electrically connected thereto.

Note that the filter capacitor FC is operative to smooth a DC voltage output from a DC voltage source, and a set of the reactor and the step-up converter is operative to boost the DC voltage smoothed by the filter capacitor FC. The boosted DC voltage is configured to be supplied to the switching unit 102.

The terminal 72a of the second busbar module 72 connected to the heat-generating elements 80 and FC is located close to the first longitudinal end L1 of the case 10, and the terminals 71a of the first busbar module 71 connected to the semiconductor module 102a are located close to the second longitudinal end of the case 10. In addition, the capacitors 11a to 11d are arranged in the longitudinal direction (X direction) of the case 10 in this order from the first longitudinal end L1 to the second longitudinal end L2 of the case 10.

Thus, the capacitors 11a to 11d are arranged to be sandwiched between the terminal 72a of the second busbar module 72 and the terminals 71a of the first busbar module 71 in the X direction. Specifically, the capacitor 11a, which is located closest to the first longitudinal end L1 of the case 10 in all the capacitors 11a to 11d, is located closest to the terminal 72a of the second busbar module 72 for the heat-generating elements 80 and FC in the X direction. In contrast, the capacitor 11d, which is located farthest from the first longitudinal end L1 of the case 10 in all the capacitors 11a to 11d, is located farthest from the terminal 72a of the second busbar module 72 for the heat-generating elements 80 and FC in the X direction.

The holder 603 has a substantially plate-like shape. The holder 603 is fitted in a corresponding region of the flange 10a of the case 10; the region matches the top surface of the second part 20b of the seal member 20. This results in the holder 603 being mounted at its bottom surface 63 on the top surface of the second part 20b of the seal member 20. The bottom surface 63 of the holder 60 faces the capacitors 11a and 11b via the seal member 20.

The holder 603 also has a top surface 62 opposite to the bottom surface 63. On the top surface 62, the electronic element 30 is fixedly mounted in the same manner as the first embodiment.

The holder 603 further has, for example, a rectangular notch 603b cut into the edge at the center of the side 603a of the holder 603. The rectangular notch 603b allows the terminal 72a to be penetrated from the end 20b1 of the second part 20b of the seam member 20b therethrough to be electrically connected to the N-side connection terminal 81 of the filter capacitor FC on the terminal holder 90.

In addition, the holder 603 has a substantially rectangular-parallelepiped concave recess 61 formed at a portion of the bottom surface 63; this portion faces the capacitor 11a via the seal member 20 such that the securing member 20c is fitted in the concave recess 61. The temperature sensor 40 is enclosed to be secured in the securing member 20c, so that the temperature sensor 40 is held by the holder 60 via the securing member 20c.

Because the temperature sensor 40 is, for example, connected to the controller via the wires 50 and the connector 52 in the same manner as the connection of the first embodiment, the description and illustration of the connection structure according to the fifth embodiment are omitted.

Particularly, the concave recess 61 is formed at the portion of the bottom surface 63, which faces the capacitor 11a via the seal member 20. For this reason, the temperature sensor 40 enclosed in the securing member 20c filled in the concave recess 61 is arranged between the capacitor 11a located closest to the terminal 72a for the heat-generating elements 80 and FC and the holder 603. In addition, the temperature sensor 40 is arranged between the electronic element 30 and the capacitor 11a located farthest from the terminals 71a for the semiconductor modules 102a.

As described above, the capacitor module 1D has a substantially identical configuration to that of the capacitor module 1 except for the difference between the structure of the holder 603 and that of the holder 60, and the difference between the number and arrangement of the capacitors 11a to 11d and those of the capacitors 11 according to the first embodiment. For these reasons, the capacitor module 1D achieves the same technical effects as those achieved by the capacitor module 1 according to the first embodiment.

Particularly, the capacitor module 1D is configured such that, at the opening top wall of the case 10, the first busbar module 71 is located on the first part 20a of the seal member 20 and the holder 603 is located on the second part 20b of the seal member 20. The first busbar module 71 is connected to the stacked switching unit 102 in which a coolant is circulated through the cooling channels 103a and the inlet and outlet coolant pipes 103b and 103c to cool the power cards 102a.

Specifically, in the capacitor module 1D, there is heat dissipation around the first busbar module 71 due to the cooling performance of the cooling mechanism 103 comprised of the cooling channels 103a and the inlet and outlet coolant pipes 103b and 103c. This causes the capacitors 11a to 11d located close to the first busbar module 71 to be also cooled via the first busbar module 71. The cooling effects of the heat dissipation around the first busbar module 71 are higher with the capacitors 11a to 11d being closer to the first busbar module 71, but lower with those being farther therefrom.

Thus, the cooling effects of the heat dissipation around the first busbar module 71 for the capacitor 11a, which is located farthest from the first busbar module 71, are the lowest in the capacitors 11a to 11d.

For this reason, the capacitor module 1D according to the fifth embodiment is configured such that the temperature sensor 40 is located at a region in the securing member 20c (concave recess 61) formed between the electronic element 30 and the capacitor 11a; the region is likely to be the highest in temperature than other regions in the seal member 20.

Specifically, the region, where the capacitor 11a is located, is likely to be highest in temperature in the seal member 20 as the result of consideration of: heat generated from each of the capacitors 11a to 11d, heat transmitted from the electronic element 30 and received by each of the capacitors 11a to 11d, and the above reason. Thus, the temperature sensor 40 is configured to measure a temperature at the region.

Because the temperature sensor 40 reliably measures the temperature at the region that is likely to be highest in temperature than other regions in the seal member 20, it is possible to accurately detect, based on the measured temperature, maximum thermal damage from and/or to the capacitors 11a to 11d.

In addition, in the fifth embodiment, the second busbar module 72 connected to the capacitors 11a to 11d is directly connected to the filter capacitor FC as one of the heat-generating elements. For this reason, heat generated from the filter capacitor FC is directly transferred to the second busbar module 72. To the filter capacitor FC, the reactor 80 as one of the heat-generating elements is connected. For these reasons, heat generated from the reactor 80 is indirectly transferred, via the filter capacitor FC or the terminal holder module, to the second busbar module 72. Heat transferred directly or indirectly to the second busbar module 72 is transferred to the capacitors 11a to 11d via the terminal 72a and the negative busbar 72b.

As a result, the thermal effects transferred from the heat-generating elements 80 and FC and received by the capacitors 11a to 11d are higher with the capacitors 11a to 11d being closer to the second busbar module 72, but lower with those being farther therefrom. Thus, the thermal effects received by the capacitor 11a, which is located closest to the second busbar module 72, are the highest in the capacitors 11a to 11d.

For this reason, the capacitor module 1D according to the fifth embodiment is configured such that the temperature sensor 40 is located at the region in the securing member 20c (concave recess 61) formed between the electronic element 30 and the capacitor 11a; the region is likely to be the highest in temperature than other regions in the seal member 20 as described above.

Specifically, the region, where the capacitor 11a is located, is likely to be highest in temperature in the seal member 20 as the result of heat generated from each of the capacitors 11a to 11d, heat transmitted from the electronic element 30 and received by each of the capacitors 11a to 11d, and the above reason. Thus, the temperature sensor 40 is configured to measure a temperature at the region.

Because the temperature sensor 40 reliably measures the temperature at the region that is likely to be highest in temperature than other regions in the seal member 20, it is possible to accurately detect, based on the measured temperature, maximum thermal damage from and/or to the capacitors 11a to 11d.

To sum up, in the fifth embodiment, the temperature sensor 40 is arranged in the region in the securing member 20c (concave recess 61) formed between the electronic element 30 and the capacitor 11a, which is located farthest from the terminals 71a for the semiconductor modules 102a and closest to the terminal 72a for the heat-generating elements.

This arrangement permits the temperature sensor 40 to reliably measure the temperature at the region that is likely to be highest in temperature than other regions in the seal member 20 in consideration of both: the cooling effects of the heat dissipation based on the cooling mechanism 103, and the thermal effects transferred from the heat-generating elements FC and 80 and received by the capacitors 11a to 11d.

Accordingly, it is possible to further accurately detect, based on the measured temperature, maximum thermal damage from and/or to the capacitors 11a to 11d.

The embodiments of the present disclosure have been described, but the present disclosure is not limited thereto.

In each of the first to fifth embodiments, as the plurality of capacitors 11, same type of plural capacitors 11 having a size and a shape are for example installed in the case 10, but the present disclosure is not limited thereto. Specifically, a single type of capacitor 11 can be installed in the case 10. Various types of plural capacitors, such as filter capacitors, smoothing capacitors, and so on, having various sizes and/or shapes can be combined to be installed in the case 10.

In each of the first to fifth embodiments, a single temperature sensor 40 is used, but the present disclosure is not limited thereto. Specifically, a plurality of temperature sensors 40 can be used as a modification of each of the first to fifth embodiments. In this modification, same type of temperature sensors 40 can be used, or a plurality of temperature sensors 40 including same type of temperature sensors and different type of temperature sensors can be used. A plurality of temperature sensors 40 can be integrally located between the electronic element 30 and the capacitors 11.

For example, two temperature sensors 40 can be integrally located between the electronic element 30 and the capacitors 11, making it possible to perform dual measurement of the temperature around the location. This example achieves the measured results with a higher reliability.

As another example, some temperature sensors 40 can be dispersively located between the electronic element 30 and the capacitors 11 for measuring the temperature around each of the different locations. This makes it possible to more accurately detect, based on the highest temperature in the measured temperatures, thermal damage from and/or to the capacitors 11a to 11d.

In each of the first to fifth embodiments, the holder 60, 600, 601, or 602 is formed to be different from the case 10, but the holder 60, 600, 601, or 602 can be formed to be integral with the case 10. For example, in a part of one sidewall of the case 10, the temperature sensor 40 can be molded, i.e. enclosed, together with the wires 50 by, for example, insert molding, while one end of each wire 50 is electrically connected as the connection terminal 51 to the temperature sensor 40.

As a first example of this modification, the part of the sidewall of the case 10 serves as a holder for holding the temperature sensor 40. As a second example of this modification, lead wires of the temperature sensor 40 can be used as the wires 50 for the temperature sensor 40, and one end of each of the lead wires can be penetrated from one sidewall of the case 10, and the connector 52 can be connected to the penetrated ends of the lead wires. In each of the first and second examples, the electronic element 30 can be mounted on an outer surface of the sidewall of the case 10 in which the temperature sensor 40 can be molded. This modification achieves, in addition to the technical effects achieved by the capacitor module 1, a technical effect of eliminating a specific member being required for the holder 60, thus reducing the number of elements constituting the capacitor module 1.

In each of the first to fourth embodiments, the capacitors 11 are linearly arranged in the lateral direction of the case 10, and, in the fifth embodiment, the capacitors 11a to 11d are linearly arranged in the longitudinal direction of the case 10, but the present disclosure is not limited thereto.

Specifically, one of various arrangements of the capacitors 11 in the case 10 can be selected. For example, four capacitors 11 can be installed in corresponding four corner portions of the inner surface of the bottom wall of the case 10 in the form of a matrix.

In the fifth embodiment, the terminals 71a of the first busbar module 71 are located close to the first longitudinal end L1 of the case 10, and the terminal 72a of the second busbar module 72 is located close to the second longitudinal end L2 of the case 10. However, the present disclosure is not limited to the arrangement.

Specifically, a modification 1E of the capacitor case 1D according to the fifth embodiment is illustrated in FIG. 10. Referring to FIG. 10, in the capacitor case 1E according to this modification, the terminal 72a is drawn from a portion of the negative busbar 72b to extend in the Z direction; the portion faces the capacitor 11b in the Z direction. The extending terminal 72a is penetrated from a portion of the second part 20b of the seal member 20 in the Z direction via a through hole 603c of the holder 603 to be electrically connected to the N-side connection terminal 81 of the filter capacitor FC. The portion of the second part 20b of the seal member 20 faces the capacitor 11b in the Z direction. That is, the terminal holder 90 is located over the through hole 603c of the holder 603. On the terminal holder 90, the terminal 72a, penetrated from the portion of the second part 20b of the seal member 20 via the through hole 603c of the holder 603, is mounted on an end of the N-side connection terminal 81 to be electrically connected thereto. Over the terminal holder 90, the end terminal 80a of the reactor 80, located over a substantially middle portion of the seal member 20 in the X direction, is mounted on the end of the P-side connection terminal 82 to be electrically connected thereto. Over the terminal holder 90, the other end terminal 80b of the reactor 80 is mounted on the terminal 83 of the step-up converter to be electrically connected thereto.

In this modification illustrated in FIG. 10, the temperature sensor 40 is located between the capacitor 11a and the electronic element 30, but the present disclosure is not limited thereto.

Specifically, the temperature sensor 40 is arranged in a region in the securing member 20c (concave recess 61) formed between the electronic element 30 and one of the capacitors 11a to 11d in consideration of both: the cooling effects of the heat dissipation based on the cooling mechanism 103, and the thermal effects transferred from the heat-generating elements FC and 80 and received by the capacitors 11a to 11d.

Thus, if the cooling effects of the heat dissipation based on the cooling mechanism 103 are sufficiently higher than the thermal effects transferred from the heat-generating elements FC and 80 and received by the capacitors 11a to 11d, the temperature sensor 40 can be arranged in a region of the seal member 20 formed between the electronic element 30 and one of the capacitors 11a to 11d; the region is likely to be highest in temperature than other regions in the seal member 20 in consideration of the cooling effects of the heat dissipation based on the cooling mechanism 103 in addition to heat generated from each of the capacitors 11a to 11d itself.

In this modification, because the temperature sensor 40 reliably measures the temperature at the region that is likely to be highest in temperature than other regions in the seal member 20, it is possible to accurately detect, based on the measured temperature, maximum thermal damage from and/or to the capacitors 11a to 11d.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A capacitor module comprising:
a case having an opening sidewall;
a capacitor installed in the case;
resin filler filled in the case, the resin filler enclosing the capacitor to seal the capacitor;
an electronic element electrically connected to the capacitor;
a temperature sensor that measures a temperature around the capacitor;
a wire member electrically connected to the temperature sensor; and
a holder mounted to the opening sidewall of the case and configured to hold at least the electronic element, the temperature sensor, and the wire member such that the holder is fixed to the resin filler while the temperature sensor is located between the electronic element and at least part of the capacitor via the resin filler and the holder mounted to the opening sidewall of the case.

2. The capacitor module according to claim 1, wherein the holder is made from a resin member, and the wire member is molded in the holder.

3. The capacitor according to claim 1, wherein the holder has a substantially plate-like shape, a first surface, and a second surface opposite thereto, the electronic element is fixedly mounted over the first surface of the holder, and the second surface of the holder faces the capacitor.

4. The capacitor module according to claim 3, wherein the temperature sensor is mounted over the second surface of the holder.

5. The capacitor module according to claim 3, wherein the temperature sensor is installed in the holder.

6. The capacitor module according to claim 3, wherein the second surface of the holder has a recess formed therein, the temperature sensor is installed in the recess, and a part of the resin filler is filled in the recess to fix the temperature sensor to the holder.

7. The capacitor module according to claim 3, wherein the second surface of the holder has a through hole formed therethrough, the temperature sensor is installed in the through hole, and a part of the resin filler is filled in the through hole to fix the temperature sensor to the holder.

8. The capacitor module according to claim 1, wherein the electronic element is comprised of a discharging resistor.

9. The capacitor module according to claim 1, wherein:
the holder has a first half part and a second half part in a length direction thereof, the capacitor module further comprising:
a busbar formed through the first half part of the holder and having a first terminal and a second terminal, the first terminal being exposed from the first half part of the holder to be electrically connected to an electronic module having a cooling function for cooling the electronic module, the second terminal being electrically connected to the capacitor in the resin filler;
the second half part of the holder holds the electronic member; and
a location of the temperature sensor between the electronic element and at least part of the capacitor via the resin filler is determined in consideration of cooling effects of the cooling function of the electronic module.

10. The capacitor module according to claim 1, wherein:
the capacitor is a plurality of capacitors, the capacitor module further comprising a busbar that establishes electrical connection between an electronic module having a cooling function for cooling the electronic module and each of the plurality of capacitors, the busbar being located through the holder to have a positional relationship with respect to each of the plurality of capacitors; and
the temperature sensor is located between the electronic element and one of the plurality of capacitors, the one of the plurality of capacitors being located farthest from the busbar in all the plurality of capacitors.

11. The capacitor module according to claim 1, wherein:
the capacitor is a plurality of capacitors, the capacitor module further comprising a busbar that establishes electrical connection between a heat-generating element that generates heat when energized and each of the plurality of capacitors, the busbar being located through the holder to have a positional relationship with respect to each of the plurality of capacitors; and
the temperature sensor is located between the electronic element and one of the plurality of capacitors, the one of the plurality of capacitors being located closest to the busbar in all the plurality of capacitors.

12. The capacitor module according to claim 1, wherein:
the capacitor is a plurality of capacitors, the capacitor module further comprising:
a first busbar that establishes electrical connection between an electronic module having a cooling function for cooling the electronic module and each of the plurality of capacitors, the first busbar being arranged through the holder to have a positional relationship with respect to each of the plurality of capacitors; and
a second busbar that establishes electrical connection between a heat-generating element that generates heat when energized and each of the plurality of capacitors, the second busbar being arranged through the holder to have a positional relationship with respect to each of the plurality of capacitors; and
the temperature sensor is located between the electronic element and one of the plurality of capacitors, the one of the plurality of capacitors being located farthest from the first busbar in all the plurality of capacitors and closest to the second busbar in all the plurality of capacitors.

* * * * *